July 22, 1947.                J. C. WILSON                 2,424,347
            MACHINE TOOL FOR CUTTING SURFACES OF IRREGULAR SHAPE
                Filed Jan. 15, 1944            7 Sheets-Sheet 5
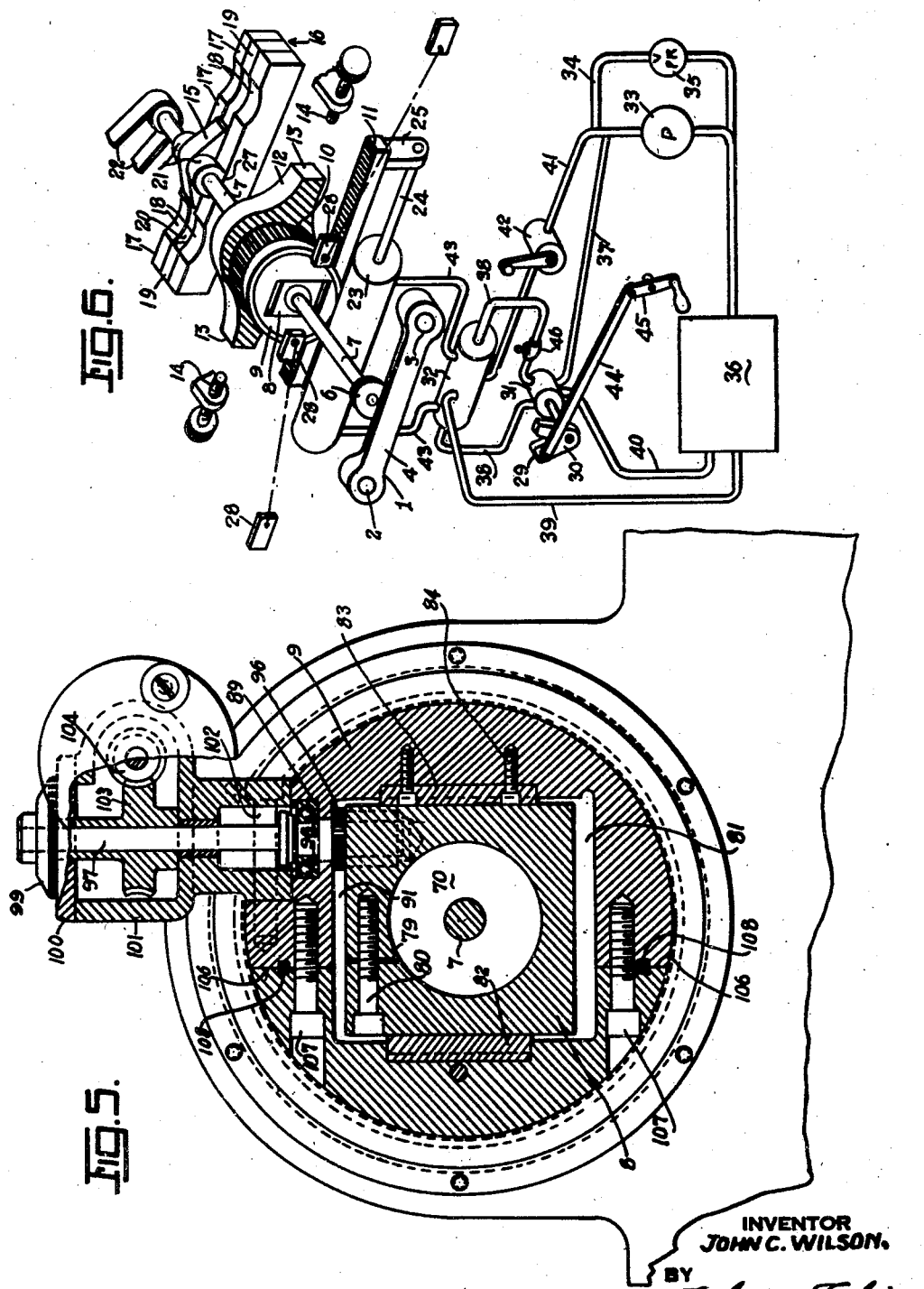
INVENTOR
JOHN C. WILSON.
BY
*Toulmin & Toulmin*
ATTORNEYS

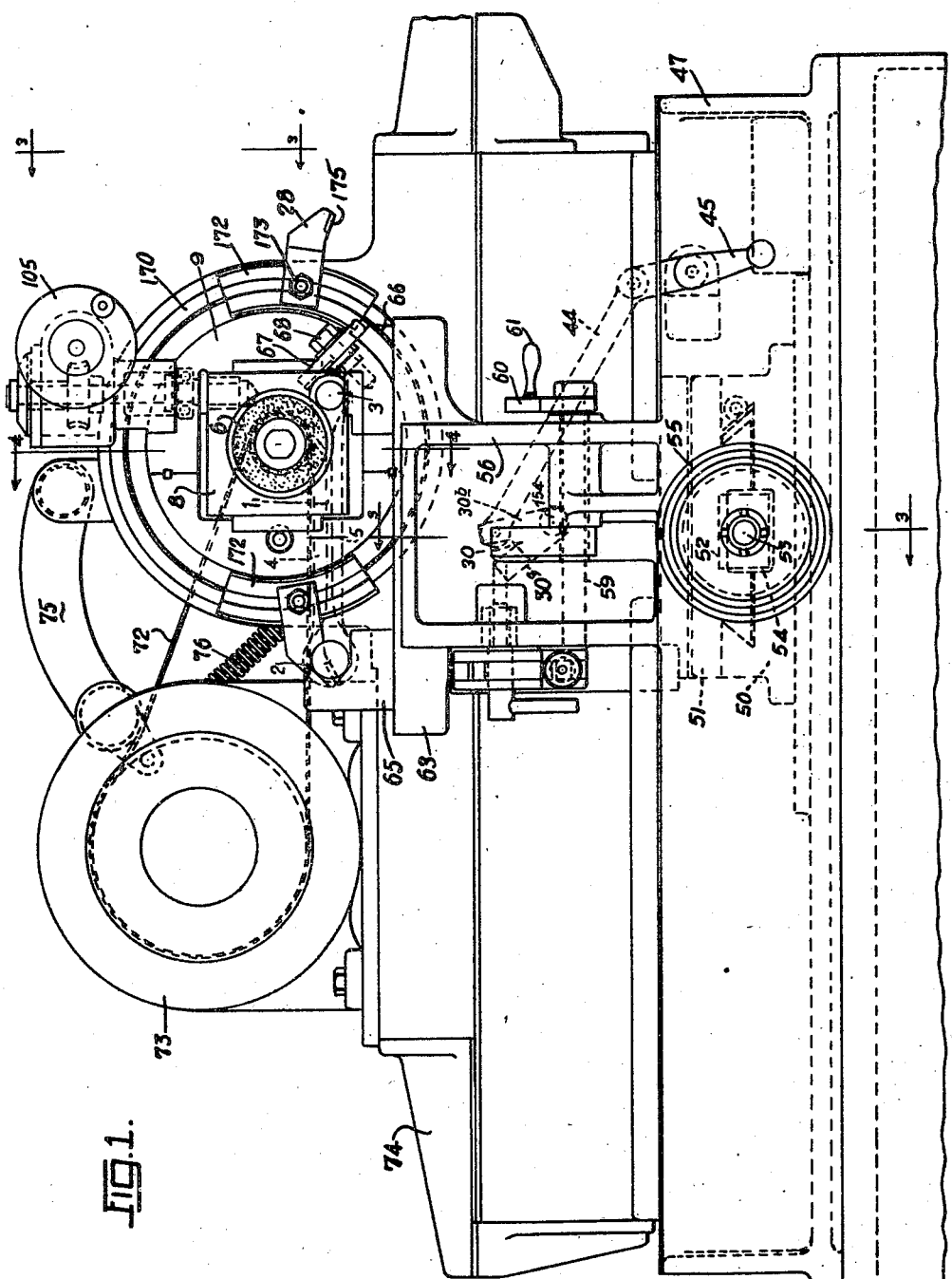

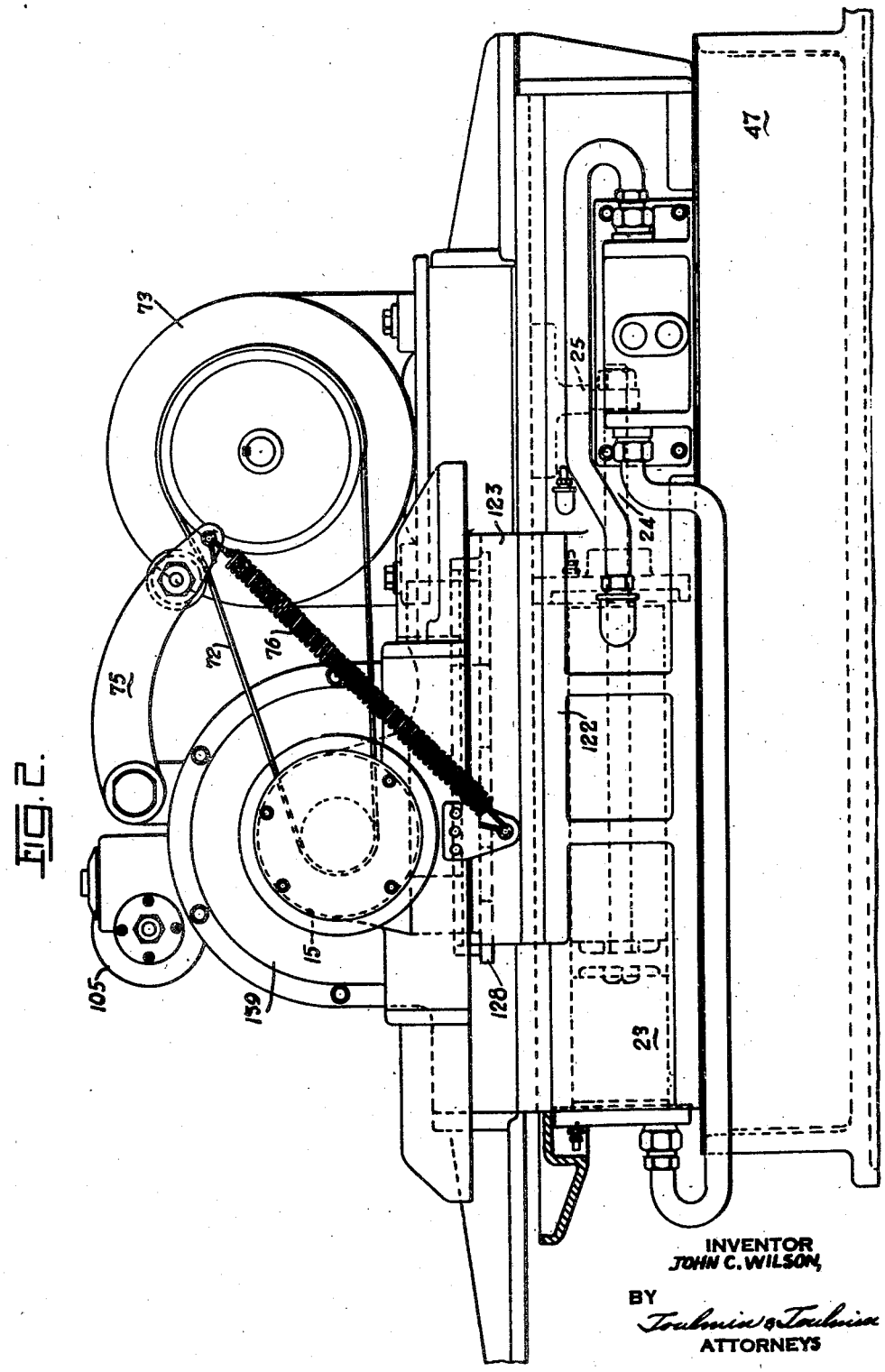

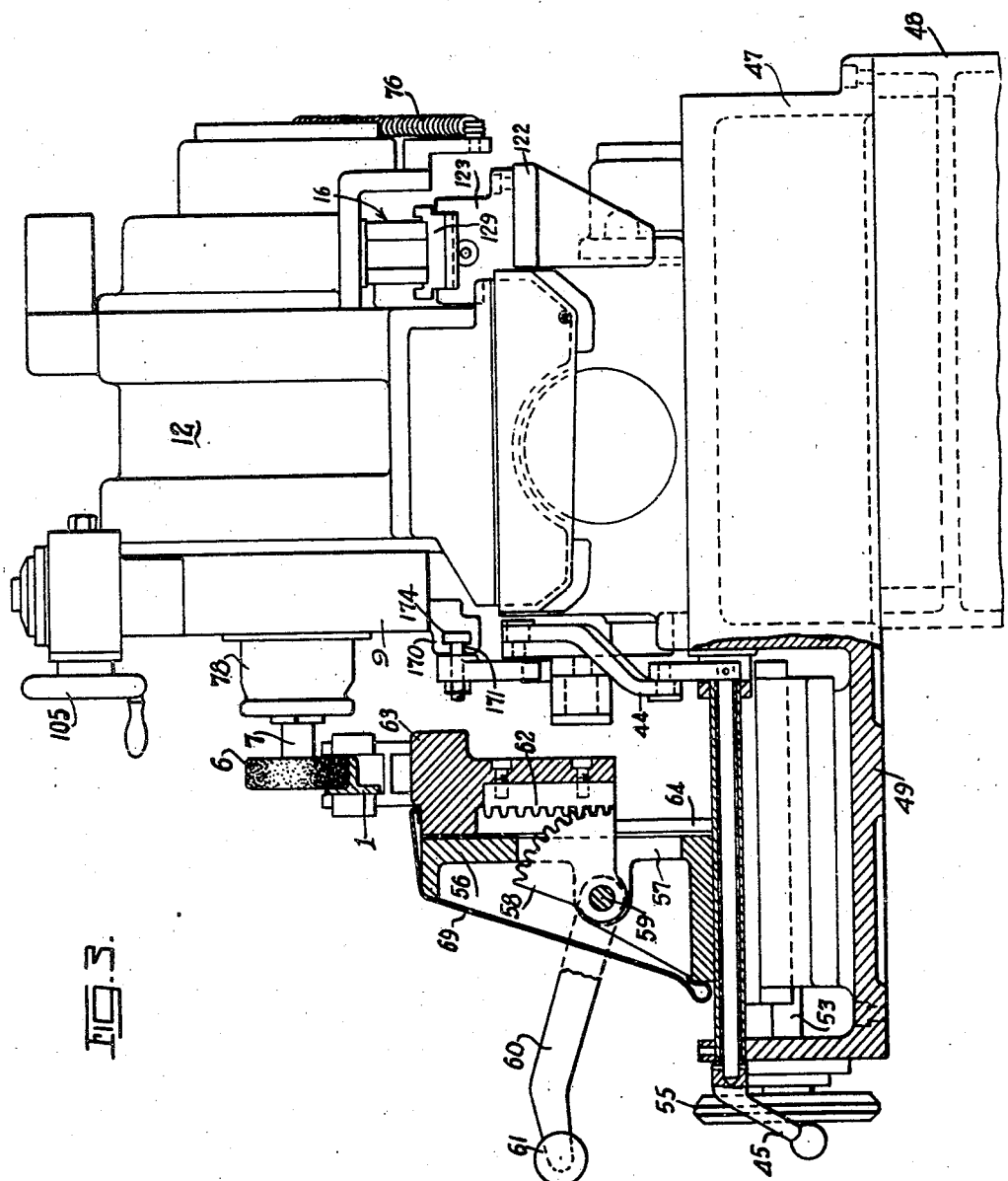

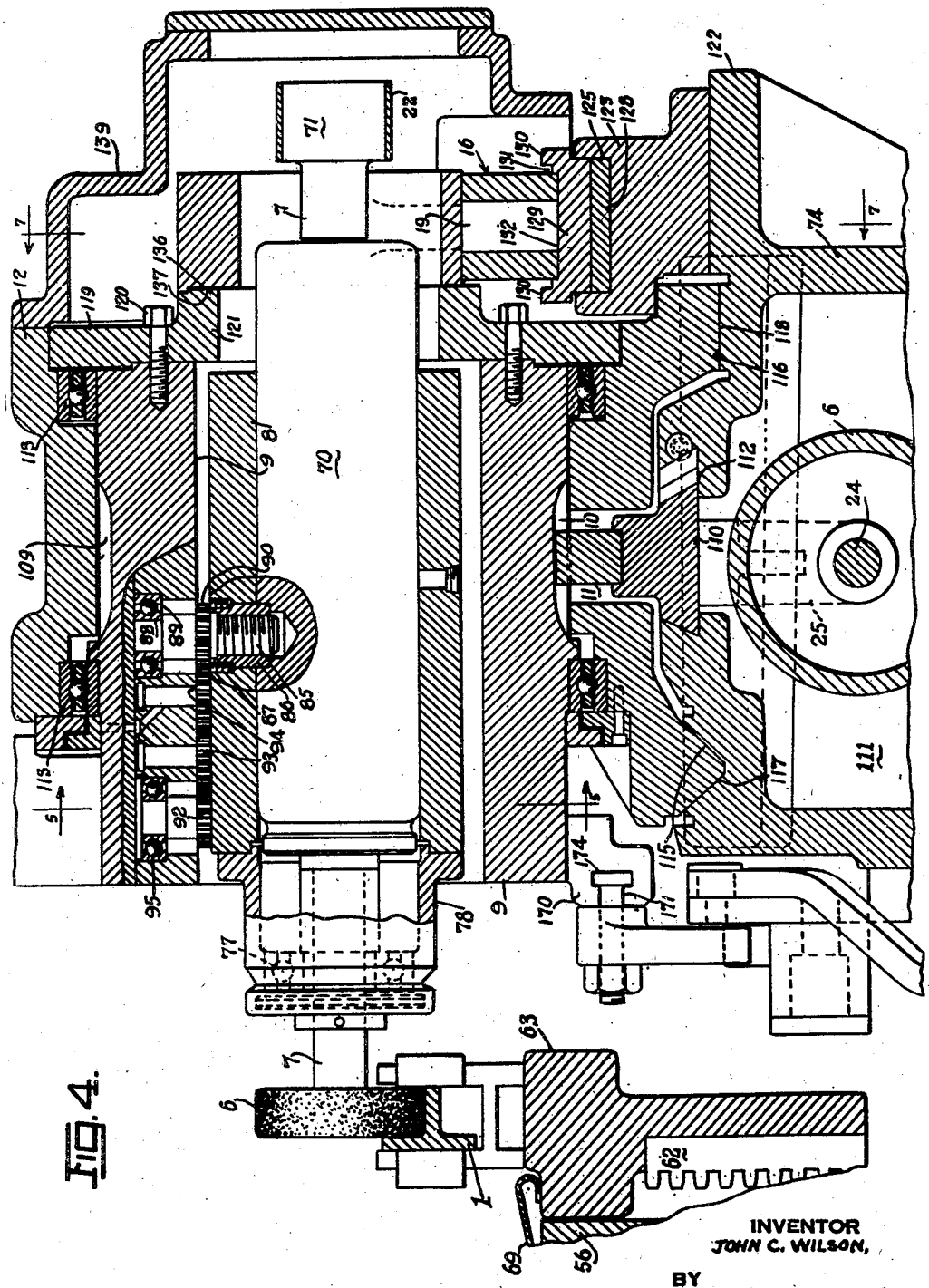

INVENTOR
JOHN C. WILSON
BY
ATTORNEYS

July 22, 1947.    J. C. WILSON    2,424,347
MACHINE TOOL FOR CUTTING SURFACES OF IRREGULAR SHAPE
Filed Jan. 15, 1944    7 Sheets-Sheet 7
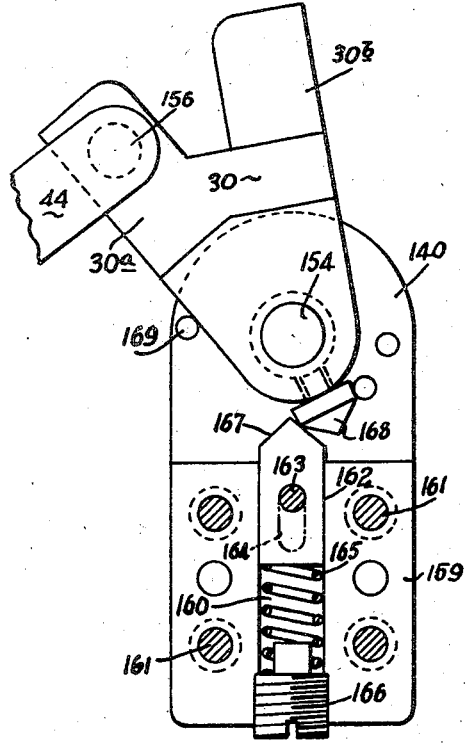
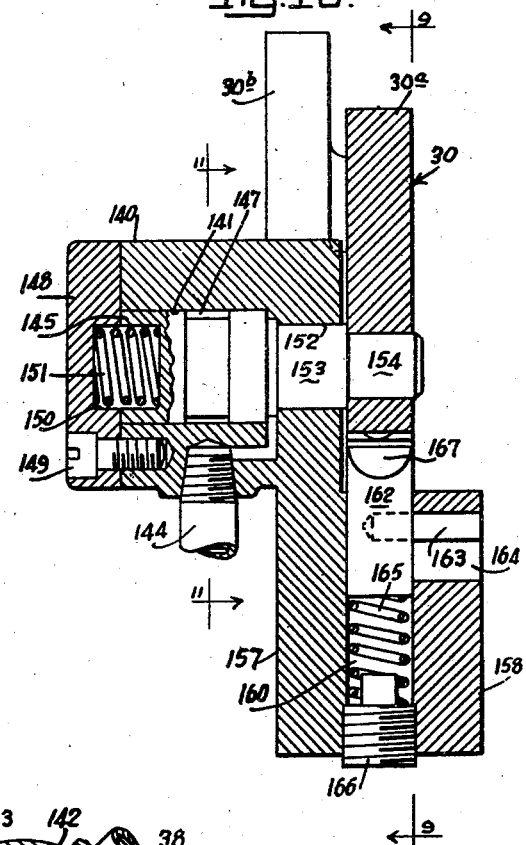
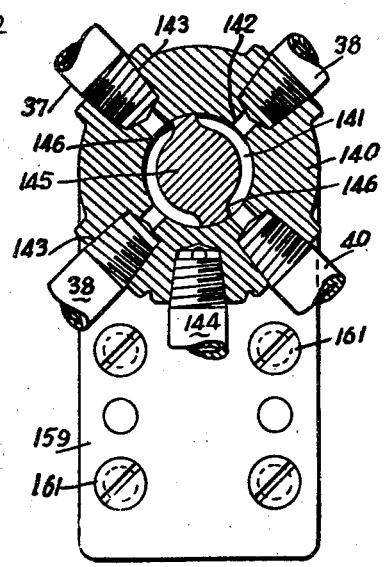
INVENTOR
JOHN C. WILSON,
BY
ATTORNEYS Patented July 22, 1947

2,424,347

UNITED STATES PATENT OFFICE 2,424,347

MACHINE TOOL FOR CUTTING SURFACES OF IRREGULAR SHAPE

John C. Wilson, Springfield, Ohio, assignor to The Thompson Grinder Company, Springfield, Ohio, a corporation of Ohio Application January 15, 1944, Serial No. 518,310

3 Claims. (Cl. 51—32)

The present invention relates to machine tools, more particularly, and improved control apparatus therefor by which to control the proper relative movement between a workpiece to be machined or ground and the working tool or grinding wheel.

In certain kinds of machine elements such as cranks and connecting rods employed in airplane automotive engines it is necessary to shape as by grinding the surfaces of the machine element to precise dimensions in order to eliminate excess material and weight without appreciably sacrificing the breakage strength or wearing qualities of the element. For example, in airplane engines where weight per horsepower is extremely critical the presence in any of the engine parts of excess material reduces the power per pound weight of the engine. In the case of a machine element such as a connecting rod where large numbers of such elements are employed in a single engine, the excess weight per element becomes greatly multiplied in terms of the excess weight of the engine as a whole.

It has therefore been the desiratum of engine designers and manufacturers to procure machine elements which provide an adequate factor of safety and yet involve weight which is absolutely no greater than that necessary to give this minimum requirement. In this connection, even a tool mark such as a slight groove might indicate unnecessary material on opposite sides of the groove or mark since this material no longer adds to the strength of the element. It is therefore desirable that all tool marks be removed from the parts.

There has also been an urgent need in the art for a machine which will cut or abrade a machine element on a quantity production basis to extremely close tolerances and which machine is readily adjustable to adapt itself to the multitudinous shapes and sizes found in machine elements employed for this purpose. These elements usually have surfaces formed of straight and curved portions in various arrangements and degrees of curvature and a machine in order to be useful must be able to accommodate any shape or size of machine element.

In the past it has been proposed to employ a template for giving the tool or grinding wheel the proper path of movement, but it is apparent that under these circumstances individual templates must be provided for every change in shape of the workpiece which may necessitate a heavy investment.

The primary object of the invention is to provide a control mechanism, particularly for use in connection with grinding and milling machines which will make it possible automatically and accurately to machine a surface composed of straight and curved portions without resorting to a template.

Another object is to provide a grinding machine or attachment for accurately grinding and removing tool marks from the irregular surfaces of machine elements within the close tolerances required on such elements, cranks, connecting rods, etc.

A still further object is to provide an improved grinding machine attachment in which the grinding wheel is caused faithfully to follow not only the straight portions of the workpiece, but also the curved portions and then automatically to reverse itself so as to make a plurality of passes over the workpiece while still conforming to the original straight and curved paths of translatory movement.

Another object is to provide a grinding machine or an attachment therefor for grinding a rounded surface of any curvature with adjustments for changing the radii of curvature of the path through which the grinding tool is automatically moved.

A still further object is to provide a grinding machine for grinding one or more groups of straight or curved surfaces with the provision of changing the translatory direction of the grinding tool at any point along any one of the straight or curved surfaces.

Another object is to provide a machine or attachment therefor in which a tool is caused to move over a workpiece through a predetermined path which had been previously set and predetermined by the machine without the need for a pattern or template.

A still further object is to provide a machine tool for machining surfaces of straight and curved configuration in which the machined tool is eccentrically journaled with respect to a rotary member and is moved along a curved path in response to rotation of the rotary member through a predetermined angle and a degree of curvature.

Another object is to provide a machine tool as set forth in the preceding paragraphs in which the control mechanism for moving the tool along the straight and curved surfaces is operated selectively either manually or automatically by hydraulic mechanical means.

A more general object is to provide a machine such as a grinder for cutting or abrading a workpiece of irregular configuration with a provision for pre-setting the paths through which the cutting or abrading tool moves and in which adjustments of any and all of these paths may be readily made either before or during the working cycle in order to fashion the workpiece to close tolerances of dimension and shape.

The invention will be better understood when reference is made to the following description and the accompanying drawings in which:

Figure 1 represents a front elevational view of a typical machine to which the improvements have been applied and illustrated specifically as a grinder, the view being taken from the operator's side and showing a workpiece as an outline in grinding position.

Figure 2 is a rear elevational view of the machine.

Figure 3 depicts an end view taken from the right hand end of the machine and with sections as indicated by the line 3—3 in Figure 1.

Figure 4 is an enlarged vertical sectional view of the spindle and barrel and immediately associated mechanism, this view being taken along line 4—4 in Figure 1.

Figure 5 is a sectional view similarly enlarged taken through the spindle and barrel as indicated by the line 5—5 in Figure 4.

Figure 6 is a schematic layout as shown in perspective of the barrel moving mechanism and including the hydraulic circuit and operating valves.

Figure 9 is a trip latch for controlling the pilot valve of the hydraulic circuit.

Figure 10 is a sectional view of the latch taken along line 10—10 in Figure 9.

Figure 11 illustrates a sectional view of the pilot valve taken along line 11—11 in Figure 10.

General arrangement

Figure 8:
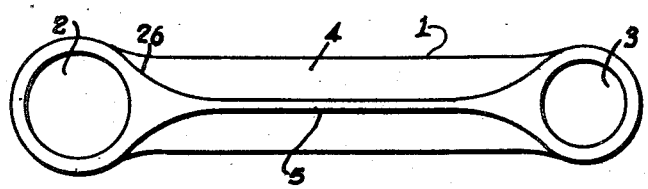
Figure 8 represents a side elevational view of a typical workpiece such as a connecting rod and showing the surfaces to be ground by the improved machine.

Referring more particularly to Figure 6, reference character 1 designates a workpiece having a pair of centers 2, 3 for bearing purposes and positioned at opposite ends thereof, these centers being connected together through a pair of webs 4, 5 (Figure 8) which are angularly positioned with respect to one another. The general purpose of the machine is to grind or otherwise work the surfaces formed between the webs 4, 5 in order to reduce the thickness of these webs to a predetermined amount, depending on the safety factor and maximum weight requirements. The work tool is illustrated as a grinding wheel 6 carried on the end of a spindle or shaft 7 and this spindle is journaled in a block 8 which is supported by and adapted to move within a barrel 9. The latter is capable of moving both in the horizontal direction as well as having a rotary movement, both of which movements are effected by the peripheral teeth 10 and the rack 11.

The barrel 9 is contained within a housing 12 in which the barrel is adapted to rotate but which moves along with the barrel during its straight line translatory movement. The housing 12 terminates at each side in a projection 13 which is adapted to abut a stop 14 at each side in order to determine the horizontal translatory movement of the barrel.

The end of the spindle 7 opposite from the grinding wheel is provided with a triangularly shaped shoe 15 which is adapted to slide over a multi-sectioned guide block generally designated 16. The latter is provided with three flat top surfaces 17 separated by a pair of downwardly extending arcuate surfaces 18, the purpose of which will be explained presently. The block 16 may be formed of two side plates having the top surfaces 17, 18 mentioned hereinbefore and separated from one another in the vertical direction by means of spacer plates 19 which extend only as far as the first edge of the nearer curved depression 18. Thus, there is left a space 20 between the side plates of the composite block. This space is somewhat wider than the thickness of the shoe 15. The latter carries a bearing 21 in which the spindle 7 is loosely journaled so that the shoe is prevented from rotating with the shaft. A pulley and belt arrangement indicated at 22 may be employed to rotate the shaft.

The rack 11 is given a reciprocatory movement by means of a hydraulic motor 23 provided with a piston rod 24 which is carried by a lug 25 secured to the rack. When the piston rod 24 is given a reciprocatory movement as will be explained hereinafter, the rack 11 causes the barrel 9 to be moved first in the horizontal or translatory direction and when the lug 13 contacts the stop bolts 14 any continued movement of the rack 11 necessarily causes a rotational movement of the barrel. Assuming that the grinding wheel 6 is rotated by the belt and pulley 22, the translatory movement of the barrel 9 will cause the grinding wheel to move along the upper surface of the web 5 (Figure 8) of the workpiece and to grind the straight portions thereof. When contact is made between the lug 13 and the stop 14 so that the barrel cannot move any further in the horizontal direction, the only movement which the barrel may undergo is a rotary movement on further actuation of the rack 11 so that the grinding wheel 6 is caused to move in an arcuate path and to travel along the curved surface or surfaces 26 (Figure 8) at the ends of the straight web portion 5. The barrel 9 is guided in its arcuate movement at each end of its translatory stroke by means of the guide block in the following manner.

The bearings 21 which are positioned on opposite sides of the wing shaped member 15 are provided with flattened surfaces 27 which rest on the upper flat surface of the guide block and the shoe 15 is so positioned that it will just clear the flat surface of the block as the barrel moves in the horizontal direction. As the bearings and the shoe move along the guide block the flattened surfaces 27 eventually come into position over one set of curved depressions 18, which position corresponds with the stop position 14, at which time the round portion of the bearings 21 is adapted to roll within the curved depression through an angle determined by the amount of taper or other shape of the upper surface of the shoe 15 which contacts with the inner edge of the spacer 19.

At the moment that the upper surface of the shoe contacts the spacer, the hydraulic pressure in the cylinder 23 is reversed in a manner as will be explained presently. The rack 11 is thus caused to move in the opposite direction and the barrel 9 is also rotated in the opposite direction until the flat surfaces of the bearings 21 come into line with the flat surfaces 17 of the block at which time the barrel ceases to rotate. While the barrel is thus moving in the said opposite direction, the grinding wheel 6 retraces its path over the curved portion 26 of the workpiece. Further reverse movement of the rack 11 causes the barrel 9 to be given a translatory movement (without rotation) in the horizontal direction because by this time, the flat surfaces 27 of the bearings 21 now fully engage the adjacently positioned intermediate flat surfaces of the guide block 16. Thus, the latter constrains the barrel 9 and wheel 6 to move in the horizontal direction so that the grinder will abrade the straight portions of the workpiece web 5.

When the grinding wheel 6 will have approached the opposite curved portion 26 of the workpiece, the projection 13 will strike the stop 14, thus preventing any further translatory horizontal movement of the barrel. But at this time the flat portions 27 of the bearings 21 will be directly over the curved recesses 18 at the end of the guide block opposite from that mentioned hereinbefore and further movement of the rack 11 in the same direction will cause the barrel 9 to rotate because the bearings 21 are adapted to roll in the recesses 18. When the upper surface of the wing shaped shoe 15 strikes the inner edge of the spacer 19, the rotary movement of the barrel is stopped and the hydraulic pressure in the cylinder 23 is automatically reversed as will now be explained.

There is secured to the barrel 9 a pair of oppositely positioned dogs 28 preferably below the center of the barrel and positioned in front of the rack 11 so as to clear the rack. Each dog is adapted to strike one or the other leg 29 of a V-shaped latch 30 which serves to rotate the control member of a rotary valve 31. Thus, when the barrel 9 is rotated clockwise the right hand dog will strike the latch to rock the same counterclockwise and in this manner control the admission and exhaust of the pressure fluid to the main operating cylinder 23 which in turn actuates the rack 11. The four-way valve 31 serves as a pilot valve for a hydraulically operated valve 32 which in turn controls the admission and exhaust of pressure fluid to and from the power cylinder 23.

The hydraulic system may comprise the following elements. A high pressure non-reversible pump is indicated at 33, the pump being by-passed by conduits 34 through a relief valve 35. Fluid for the pump 33 is obtained from a tank 36 and a high pressure line is taken through conduit 37 to the pilot valve 31. This valve is shown in enlarged form in Figure 11 and will be described when the details of the structures are considered separately. The cylinder 32 includes a power driven valve and the high and low pressure conduits for moving the pistons within the valve are indicated at 38 which pass into the pilot valve 31. The exhaust from the power driven valve 32 and the valve 31 is taken through the conduits 39 and 40 respectively to the tank 36. A pipe 41 is connected to the high pressure side of the pump 33 and passes through a manually controlled cut-off valve 42 to the high pressure side of the four-way valve 32 in order to supply pressure fluid to either of the conduits 43 depending on the position of the valve within the cylinder 32.

Assume that the grinding wheel 6 has completed its upward movement at the left hand end of the workpiece 1 and it becomes necessary to reverse the pressure fluid in the cylinder 23, the right hand dog 28 will have at this moment struck the latch 29 and moved the rotary valve 21 in the counterclockwise direction through a limited angle. Pressure fluid at this time is delivered from the conduit 37 through the valve 31 to the left hand conduit 38 and thence to the left hand end of the power driven valve 32. The latter is thus operated to permit pressure fluid from conduit 41 to pass through the valve 32 to the left hand conduit 43 and thence to the left hand end of the hydraulic motor 23. This in turn causes the rack 11 to move from left to right and as explained hereinbefore, the barrel 9 is caused to rotate through a predetermined angle until the flat portion of the shoe 15 strikes the upper surface of the spacer 19 whereupon continued movement of the rack 11 from left to right causes the barrel 9 to be translated in a horizontal direction without rotation.

It is apparent that when the barrel 9 reaches the opposite end of its travel after having executed the rotary movement which was explained hereinbefore, the left hand dog 28 will strike the left hand leg 29 of the latch 30 to apply pressure fluid to the right hand end of the cylinder 23 and open the left hand end of the cylinder to exhaust as will be understood by those skilled in the art.

Instead of relying on the automatic operation of the dogs 28 and the latch 30 to control the reciprocatory movements of the barrel 9, I may utilize a manual control shown in Figure 6. A connecting rod 44 is secured to the latch 30 at one end, and at the other end is pivotally mounted on a hand-operated lever 45. It is apparent that by rotating the lever the latch 30 may be swung in the clockwise or counterclockwise direction and thus control the admission of pressure fluid to one or the other ends of the cylinder 23. In practice, the manual control 45 is normally used in conjunction with the automatic control effected by the dogs 28 and the arrangement is such that each control can be exercised independently of the other so as accurately to effect the time at which high pressure fluid is introduced into the hydraulic motor 23. A choke valve 46 may be inserted in one or both of the conduits 38 in order to reduce the pressure applied to one or both ends of the power driven valve 32. The purpose of the cut-off valve 42 is merely to stop the delivery of pressure fluid to the main cylinder 23 in cases of emergency.

The general arrangement thereof is such that the grinding wheel 6 is caused first to move along the straight portions of the web 5 of the workpiece and thus grind the surface to the proper dimension and then the center of the grinding wheel is caused to move through an arcuate path, still being propelled by the rack and determined by the amount of eccentricity that the spindle has with respect to the barrel 9. The wheel is caused automatically or manually to reverse its movement so that both curved surfaces 26 of the workpiece and the straight portion 5 are ground completely to size as determined by the various adjustments which will be explained hereinafter.

Work cross feed and elevating mechanism

The parts of the machine are carried on a pair of superposed bases 47, 48 (Figure 3) secured together. These bases are hollow for receiving any of the various parts of the operating mechanism such as the pump 33 (Figure 6), the tank 36, and any of the operating valves. The upper base 47 is provided with a box-like shelf 49, the bottom of which carries a grooved block 50 (Figure 1) for mating with a tongued slide 51 (Figure 1). The tongue is provided with a block 52 having a threaded bore for receiving a threaded rod 53

(Figure 3). The block 52 is loosely received within a groove 54 formed in the block 50. The rod 53 terminates in a handle 55 which upon being rotated causes the slide 51 to move from left to right and vice versa as seen in Figure 3. Mounted on this slide there is a webbed upright member 56 provided with a slot 57 (Figure 3) in which is mounted for vertical movement a segmental gear 58. The latter is swivelled on a shaft 59 and a lever 60 is connected to the shaft, which lever terminates in a handle 61. By moving the handle upwardly or downwardly, the segmental gear can be rotated clockwise or counterclockwise. This gear meshes with a rack 62 which is carried on a plate 63, tongued and grooved as indicated at 64 to the upright 56. Thus, as the handle 61 is pressed downwardly, the plate or platform 63 is moved upwardly and as the hand wheel 55 is rotated, the platform 63 is moved either to the right or left of the machine as seen in Figure 3.

There is a pair of adjacently positioned blocks 65 at one end of the workpiece and a single block 66 at the other end of the workpiece (Figure 1) secured to the platform 63 for holding the workpiece 1 in position. In practice, a rod is passed through the opening 2 of the workpiece and this rod is caused to rest against accurately ground surfaces of the blocks 65 in order closely to position the left hand end of the workpiece. A suitable clamping device is applied against this rod. The right hand end of the workpiece is usually fitted directly against a V-shaped bearing surface provided on the right hand block 66, one of these bearing surfaces being formed of a hardened plate 67 which is bolted as indicated at 68 to the block 66. It is therefore possible to hold the right hand end of the workpiece in position by means of the bolted plate 67 on its block. It will be noted that the holding devices are such as to leave that part of the workpiece exposed which it is desired to grind by the wheel 5. Thus, the workpiece is accurately brought into position under the wheel both in the vertical and in the crosswise direction by operating the handle 61 and the hand wheel 55 respectively. If desired, a cover 69 may be snapped over the upright 56 to prevent any detritus from reaching the gear 58 and the rack 62.

*Grinding wheel support including eccentrically mounted block*

The grinding wheel 6 is mounted on a shaft 7 which passes loosely through a cylindrical support 70 (Figure 4) and is frictionlessly journaled therein. The shaft continues through the support and terminates in a pulley 71 over which a belt 22 travels (see Figure 6). A motor 73 (see Figure 1) is secured to a large upper base casting 74 which drives the pulley 71 through the belt. If desired, a belt tightener 75 of any well known type may also be employed, the tightening effects being imparted through a tension spring 76 (Figure 2).

The shaft 7 is journaled in ball bearings 77 contained within a cap closure member 78 and the latter is secured to one end of a block member 8 which immediately surrounds the cylindrical support 70. In order to tighten the block about the support it is provided with a slot 79 (Figure 5) and a screw 80 passes through the block on opposite sides of the slot in order to draw the ends of the block together and thus apply a clamping effect to the contained support.

The block 8 preferably has a rectangular configuration as seen in Figure 5 and is received by a rectangular opening 81 formed within a two-part housing or barrel 9. The opening 81 is of considerably greater length in the vertical direction (Figure 5) than height of the block 8 to provide spaces directly above and below the block to permit the block to move in a vertical direction with respect to the barrel 9. For this purpose the block is provided at the left hand end with a vertical tongue and groove arrangement indicated at 82 and at the right hand side the block is caused to bear against a wear plate 83 which is secured to the barrel 9 by screws 84. The block is supported at its right hand side (Figure 5) and in the vertical direction by means of a threaded stub shaft 85 which is received by a hardened threaded bushing 86 secured as by screws 87 in an opening within the block. The upper end of the shaft 85 is journaled in ball bearings 88 supported on a shoulder 89 formed in the upper end of the barrel. There is provided a small gear 90 intermediate the ends of the shaft and positioned in the space 91 left between the upper surface of the block 8 and the rectangular opening 81.

Three small gears 92, 93, 94 respectively are suitably journaled within the upper portion of the barrel, meshing with one another and gear 94 of this group engages the gear 90. The gear 92 may be journaled in ball bearings 95 if desired. This gear is driven by a gear 96 (Figure 5) which is also positioned in the space between the block and the barrel, the gear 96 being carried on a shaft 97 which is journaled in ball bearings 98. The upper end of the shaft 97 carries a heavy washer or cap 99 supported on a cover plate 100. The latter may be secured to a large hollow casting 101 which is screwed or otherwise secured at 102 to a grooved recess formed in the barrel 9. An arcuate gear 103 is keyed to the shaft 97 within the casting or housing 101 and this gear meshes with a worm 104, the shaft of which projects through the casting and terminates in a hand wheel 105. Thus, by turning the hand wheel the shaft 97 is caused to rotate and the rotatable effort is communicated through the gears 96, 92, 93, 94, 90 to the threaded shaft 85. When the hand wheel is thus turned, the block 8 can therefore be moved upwardly or downwardly within the opening 81, depending on the direction in which the wheel is turned and the eccentricity of the shaft 7 with respect to the barrel 9 is accordingly changed. The purpose of varying the eccentricity of the shaft 7 with respect to the barrel was explained in connection with Figure 6 and is reiterated at this point merely to bring out the fact that the path described by the grinding wheel at each end of the straight portions of the workpiece may be predetermined and readily controlled by simply turning the hand wheel 105.

For constructural reasons the barrel 9 is made in two parts joined together at the joints 106 by means of screws 107, the parts being guided in position by keys 108. Under these circumstances the sides of the rectanguar opening 81, particularly, the surfaces against which the block 8 bears, may be carefully ground to size so that the block is held snugly and accurately in position with respect to the barrel and yet readily permits vertical movement of the block within the opening when the hand wheel is turned.

*Barrel rotating mechanism*

It has been brought out hereinbefore that when the barrel 9 is rotated by the rack 11 (Figure 6) as the grinding wheel 6 reaches the end of the straight portion of the ground surface the wheel is caused to move through a curved path which is determined by the eccentricity of the shaft 7 with respect to the barrel. For this purpose the barrel is caused to rotate through a predetermined angle under the control of the wing shaped shoe 15. The barrel is therefore provided with an annular recess indicated at 109 (Figure 4) which is spanned by a series of longitudinally extending teeth 10 equidistantly spaced. The rack 11 which is adapted to mesh with these teeth is carried on a tongue shaped slide 110 and a strap 25 (Figures 4 and 6) is connected between the slide and the shaft 24 of the hydraulic motor 6. The latter is contained within a large compartment 111 formed within the top casting 74. The slide 110 is adapted to move within a wedge shaped groove 112 formed in the upper end of the casting 74.

The barrel 9 is rotatably mounted on ball bearings 113 within a hollow housing 12 and the lower end of the housing terminates in a V-shaped way 115 at one side and a flat bearing surface 116 at the other side which engage and rest on the V-shaped groove 117 and the upstanding projection 118 respectively. An end cover member 119 may be bolted as indicated at 120 to the right hand end of the barrel 9, this member having a large opening 121 which clears the outside diameter of the cylindrical support 70.

It is apparent that as the piston rod 24 (Figure 4) is given a movement for example as coming out of the drawing, the barrel 9, its housing 114 and the contained cylindrical support 70, including the grinding wheel 6 is caused to move with respect to the casting 74 at the V and flat shaped ways 115, 118 until the projection 13 on the housing 12 (Figure 6) strikes the stop 14 at which time continued movement of the rack 11 will cause the barrel 9 to rotate in the counterclockwise direction as seen from the left hand end of Figure 4. During this rotational movement the barrel 9 will be obviously supported by the ball bearings 113.

Guide block and shoe construction

Figure 7:
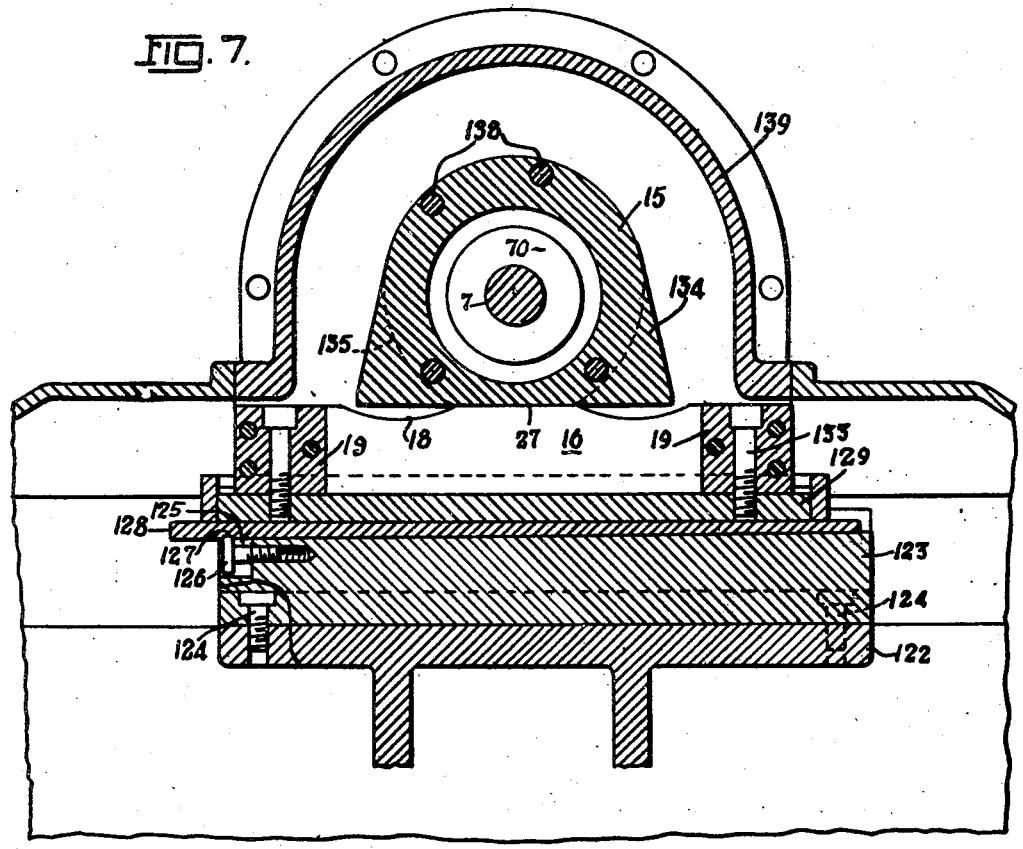
Figure 7 is a sectional view taken along line 7—7 in Figure 4.

The casting 74 (Figure 4) is provided with a ribbed shelf 122 on which rests a heavy foundation block 123 and secured thereto as indicated by the screws 124 (Figure 7). The block 123 is provided with a rectangular recess indicated at 125. The block 123 is provided at the left hand end (Figure 7) with a groove for receiving the head of a screw 126. This head fits into a notch 127 of a plate 128 which is thicker at one end than at the other. As the screw 126 is turned further into the block 123 the tapered plate 128 is moved from the left to the right (Figure 7). Directly above the plate 128 and resting thereon there is a block 129 provided with a pair of side flanges 130 with step-down grooves 131 to leave a flat surface 132 for carrying the guide block 16. As was explained in connection with Figure 6, this guide block comprises a pair of side plates and a spacer plate 19. The guide block is secured to the block 129 and is fixed in horizontal position by means of the bolts 133 (Figure 7) but is adapted to move in the vertical position when the screw 126 is tightened to move the tapered plate 128 from left to right (Figure 7). Thus this tapered plate serves to elevate the guide block through a relatively short distance and more particularly to move the left hand end of the block through a slightly greater distance than the right hand end, thus aligning the upper flat surfaces 17 of the block with respect to the shoe 15 which will now be described in detail.

The shoe is constituted of a centrally disposed plate member 134 having downwardly extending wing portions and at each side of the plate there is a centrally positioned cylindrical hub 135. This hub is provided with a circular depression 136 (Figure 4) for rotatably receiving a circular projection 137 formed on the cover member 119. The arrangement is such that the shoe 15 is adapted to rotate about the end of the cover member under the conditions which were explained in connection with Figure 6. A convenient way of fabricating and assembling the shoe is to form the hubs as ring shaped members separate from the plate 134 and then dowel the three parts together as indicated at 138. The lower surface of the wing shaped plate 134 rests only lightly on the flat surfaces of the guide block 16 and in order to get nicety of pressure between this surface and the guide block the screw 126 may be turned to move the guide block upwardly or downwardly to its proper position.

It has been explained when discussing Figure 6 that the wing plate 134 is adapted to enter the space left between the two guide plates 16 by the spacer 19 when the rack 11 has been caused to move after the horizontal movement of the barrel has been stopped by the stop screw 14. It has also been explained that each hub portion is provided with a flat surface 27 (Figure 6) in order to permit the shoe to ride over the intermediate flat surfaces 17 of the guide block while at the same time, preventing rotation of the barrel 9 during the time that the shoe is passing over the said intermediate flat surface.

Thus, the shoe permits the barrel 9 to move in a horizontal direction without rotation when the rack 11 is actuated until the projection 13 strikes the stop 14, at which time the wing extension 134 is permitted to enter the space between the end guide plates 16 and the circular portion of the hubs 135 is permitted to roll around the arcuate recesses 18 of the guide block.

It may be advisable in practice to provide a protecting metal cover 139 over the entire guide block and shoe structure.

Pilot valve and reversing latch for initiating reversal of the rack

It was explained in connection with Figure 6 that the pilot valve 31 controls the power-operated 4-way valve 32 and the latter in turn controls the hydraulic motor 23 for operating the rack 11. An enlarged sectional view of the pilot valve is illustrated in Figures 10 and 11. The casing 140 of the valve constitutes a heavy casting and takes a general cylindrical shape with a longitudinally extending round opening 141 in the middle. Ducts 142 extending radially from the opening 141 are equidistantly spaced about the casing and these ducts open into large counterbored holes 143 for receiving threaded pipes 37, 38 and 40 which correspond with the high pressure supply conduit, the power-operated valve conduits and the low pressure or exhaust conduit respectively as shown in Figure 6. In addition to the four conduits 37, 38, 40 there is a centrally disposed conduit 144 which connects back to the tank 36 (Figure 6) and serves to drain the interior of the valve of fluid collected therein as will be explained presently.

The rotor or actuated element of the valve comprises a solid cylindrical member 145 having bearing lugs 146 which serves to separate the high and low pressure passageways from one another as the element 145 is rotated. The latter actually constitutes a cylinder which completely fills up the entire opening 141 (Figure 10) and the passageways between the bearing surfaces 146 are formed by annular depressions 147 of a limited length which occur directly in line with the openings 142. The casing 140 is provided with a closure member 148 which is screwed as indicated at 149 or otherwise secured to the casing. There is a pair of aligned countersunk openings 150 extending into the cover 148 and the cylinder 145 for receiving a compression spring 151 in order to force the rotary valve element 145 against its right hand seat as seen in Figure 10. The casing 140 is provided with an opening 152 through which a shouldered portion 153 of the element 145 extends and this portion terminates in a portion 154 of smaller diameter. There is a V-shaped block 30 (see Figure 6) keyed to the shaft portion 154, this block serving as a latch for operating the valve element 145 as will be explained presently. The block 30 comprises two portions 30a and 30b (Figures 9 and 10) of which portion 30a is superposed on portion 30b to bring these portions to positions offset from one another, i. e., on different levels as seen in Figure 9, the purpose of which will be explained hereinafter. The lever 44 (see Figure 6) is swivelly connected as indicated at 156 to the portion 30a of the latch. The arrangement is such that as the lever 44 is reciprocated, the latch 30 can be swung through a limited angle and thus rotate the valve element 145 to place the high pressure conduit 37 either in communication with the left hand or with the right hand conduit 38 of the power controlled 4-way valve 32. In order to assure that the valve element 145 will move fully from one extreme position to the other so that the conduit 37 will always be in communication with one of the conduits 38 and the remaining conduit will always be in communication with the low pressure or exhaust conduit 40, I have provided a spring latch accessory which will now be described. The casing 140 is provided with a downwardly extending plate 157 (Figure 10) which is separated from a cover plate 158 by means of a pair of separated spacer plates 159. The spacers 159 are so positioned as to leave a large slot 160 therebetween and all of the plates are screwed together as indicated at 161 and additionally doweled if desired.

The slot 160 receives a slide 162 which is provided with a pin 163. This pin is adapted to move within a closed end slot 164 provided in the outer plate 158. Directly below the slide 162 and contained within the slot 160 there is a compression spring 165, the compression of which is regulated by a set screw 166 threaded into an opening formed in the several plate structure 157, 158 and 159.

The slide 162 terminates in an angular end 167 which cooperates with a conically shaped tip member 168 which is secured to the lower end of the latch 30. The angular relation between the elements 167 and 168 is such that when the lever 44 is pushed upwardly (Figure 9) to cause the slide 162 to be forced downwardly against the spring to permit the element 168 to clear the apex of the slide, the spring tends to press the slide upwardly and therefore to force the latch 30 over to its extreme right hand position. Thus, the spring-urged slide 162 in cooperation with the tip element 168 prevents the latch 30 from taking a neutral position. If desired, pins 169 may be provided to determine the limits of swing of the latch 30.

It is evident that as the latch 30 is in the position shown in Figure 9, high pressure fluid from the conduit 37 is admitted to the left hand cylinder conduit 38, and the right hand cylinder conduit 38 is placed in communication with the exhaust or tank conduit 40. When the latch 30 is swung to its right hand position, the high pressure conduit 37 is placed in communication with the right hand cylinder conduit 38 while the left hand cylinder conduit 38 is brought into communication with the exhaust or low pressure conduit 40. Operation of the lever 45 (Figures 1 and 6) causes pressure fluid to be admitted either to the right or left hand end of the main operating cylinder 23 to cause the rack 11 to reciprocate for reasons explained hereinbefore.

*Automatic reversal of the rack*

In practice, the lever 45 would be employed mainly for special adjustment purposes or in the case of emergency. The rack 11 would normally be automatically moved in the opposite direction after reaching its extreme left or right hand position in a manner which will now be explained. Referring more particularly to Figures 1 and 3, the end of the barrel 9 is provided with an outwardly extending flange 170 having an annularly shaped groove for receiving slides of arcuate configuration which form part of a pair of plates adapted to bear against the external surface of the flange 170. These plates therefore can slide about the flange member within the tracks formed of the same slides and the grooves 171. In order to fix the plates 172 in any predetermined position on opposite sides of the drum a pair of bolts 173 is provided, the heads of which fit into an under-cut groove 174 which extends around the flange. A pair of dogs 28 having contact pieces 175 is secured by the bolts 173 to the plates 172, these dogs extending out substantially radial from the drum. The dogs 28 are arranged out of line with one another and have such length that when the drum 9 is rotated clockwise as seen in Figure 1, the right hand dog 28 will move past the portion 30b of the latch 30 (Figure 9) and will strike the inner surface of the portion 30a.

On the other hand, when the drum 9 moves in the counterclockwise direction, the left hand dog 28 will pass the near surface of the portion 30a of the latch 30 and will strike the inner surface of the portion 30b. Thus, the dogs 28 perform the same function as the lever 44 in controlling the admission of pressure fluid to opposite sides of the hydraulic motor 23 by the control exercised through the pilot valve 31 and the power-operated 4-way valve 32 as has been explained hereinbefore. It has been brought out that the reversal of the barrel 9 takes place when the grinding wheel 6 has moved to the end of its arcuate path and therefore has finished the grinding operation along the curved portion of the workpiece 4. In order to effect reversal of the drum at the proper moment the position of the dogs 28 can be accurately adjusted by moving the plates 172 around the edge of the drum after unloosening the bolt 173.

From the foregoing it is evident that I have disclosed an improved grinding machine or an attachment therefor for controlling the movement of a grinding wheel over a workpiece which has straight and curved portions to be ground. The degree of curvature of the path that the wheel is caused to take can be accurately controlled by changing the eccentricity of the shaft 7 with respect to the barrel through a movement of the hand wheel 105. Moreover, the exact position at which the grinding wheel 6 is caused to leave its movement in the straight direction and to move in a curved path is controlled by the relative positions of the curved recesses 18 of the guide block with respect to the straight portions 17.

Finally, the exact moment at which the barrel 9 and therefore the grinding wheel 6 is caused to effect a return movement can be controlled and adjusted by means of regulating the position of the dogs 28 about the barrel 9, although if desired, a manual control of this reversal point can be effected at the hand wheel 45. Consequently, the entire operation of the machine is automatic and the various adjustments can be pre-set by trial and error or in any other suitable manner to provide a grinding operation on a connecting rod or other workpiece with absolute assurance that the machine will duplicate the grinding operation on a quantity production basis. Workpieces of extremely accurate dimensions and having irregular surfaces composed of straight and curved portions may therefore be accurately ground to size with little or no supervision on the part of the operator after the machine has been properly set.

While I have described the invention in connection with a grinding wheel or a grinding machine it will be understood that the invention is not limited to this type of apparatus but may be applied to any form of machine in which a workpiece is to be cut, milled or abraded to any size and shape which includes straight and curved surfaces.

It will be understood that I desire to comprehend within my invention such modifications as come within the scope of the claims and the invention.

Having thus fully described my invention, what I claim as new and desire to secure by Letters Patent is:

1. Apparatus for machining a workpiece to shape and size, said workpiece having straight and curved surfaces to be machined and carried by a support, a reciprocable tool holder adapted to receive a tool for machining said workpiece, said tool holder being rotatably mounted within a rectangular block, said block being slidably received by an opening in a rotatable carrier, said opening being of greater length than said block and means for moving said block away from the axis about which said carrier rotates in order to change the eccentricity of the tool holder with respect to carrier, means for giving the carrier a translatory movement while preventing rotation thereof and later for giving the carrier a rotational movement while preventing a translatory movement thereof in order to cause the tool holder to describe first a straight path corresponding to the straight surface of the workpiece and then a curved path corresponding to the curved surface of the workpiece, the curvature of which is controlled by the distance that the block has been moved from the axis of rotation of the carrier.

2. Apparatus for machining a workpiece to shape and size, said workpiece having straight and curved surfaces to be machined and carried by a support, a tool holder adapted to receive a tool for machining said workpiece, said tool holder being mounted in a block, a carrier having an opening of larger size than the block and adapted slidably to receive said block, said carrier being adapted to be moved in the translatory and rotational directions in order to cause the tool to pass over the straight and curved surfaces of the workpiece and means for moving the position of said block with respect to said carrier in order to adjust the amount of eccentricity of the tool holder with respect to the carrier, said means including a driving mechanism which terminates at the exterior of the machine in a hand wheel by which the amount of eccentricity of the tool holder within the carrier may be accurately controlled.

3. In an apparatus for consecutively machining straight and curved surfaces of a workpiece, a base, a housing translatable on said base in a first direction, a barrel journaled in said base for rotation about a first axis normal to said direction, a block, a tool support in said block, said support having an axis parallel to said first axis, means mounting said block for radial movement in and relatively to said barrel to vary the separation of said axes, first means to translate said housing, barrel, block and support as a unit to a predetermined point, means stopping translation of said housing at said point, said first means thereafter rotating said barrel to move said carrier an arc of radius determined by the separation of said axes, and means for holding a workpiece in position to be operated upon by a tool in said support.

JOHN C. WILSON.

REFERENCES CITED

The following references are of record in the file of this patent:

UNITED STATES PATENTS

| Number | Name | Date |
|---|---|---|
| 1,193,661 | Bartels et al. | Aug. 8, 1916 |
| 1,332,437 | Ely | Mar. 2, 1920 |
| 2,086,915 | Kopp | July 13, 1937 |
| 2,314,483 | De Vlieg | Mar. 23, 1943 |
| 2,247,228 | Flygare | June 24, 1941 |
| 1,800,991 | Forst | Apr. 14, 1931 |
| 2,294,492 | Wilson | Sept. 1, 1942 |